N. M. RISING.
CANNING DEVICE.
APPLICATION FILED JULY 8, 1918.
1,294,706.
Patented Feb. 18, 1919.
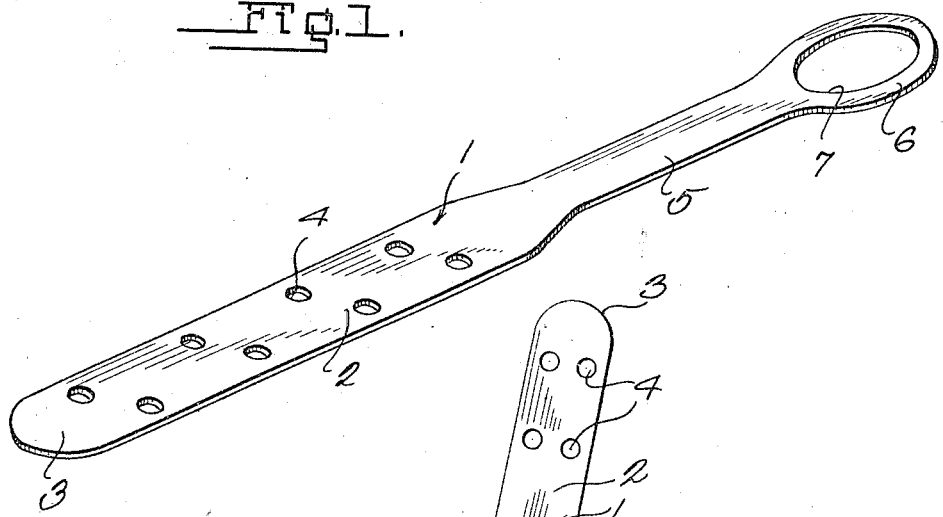
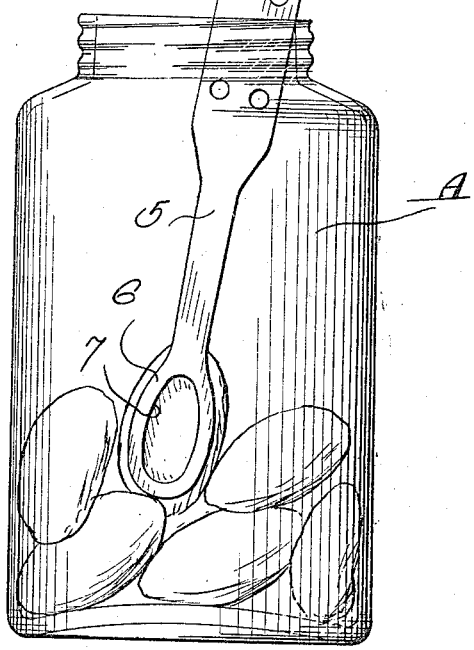
N. M. Rising, Inventor
By Lancaster and Allwine, Attorneys

UNITED STATES PATENT OFFICE.

NELLIE M. RISING, OF WESTON, WEST VIRGINIA.

CANNING DEVICE.

1,294,706.   Specification of Letters Patent.   Patented Feb. 18, 1919.

Application filed July 8, 1918.   Serial No. 243,838.

*To all whom it may concern:*

Be it known that I, NELLIE M. RISING, a citizen of the United States, and a resident of Weston, in the county of Lewis and State of West Virginia, have invented certain new and useful Improvements in Canning Devices, of which the following is a specification.

In canning or preserving fruits, vegetables, and other edibles, various means are resorted to for the purpose of preventing the cracking or breaking of the glass jars or containers, when placing the hot edibles therein, such as placing the jars or containers in a receptacle of hot water, wrapping the containers in hot cloths or various other ways, all of which are either slow and unhandy, or otherwise impractical. It is an object of this invention to provide a device, which is extremely simple in construction, being formed of heat conducting metal which may be placed in the jar or container, when the hot edibles are being placed therein and which will act as a conductor to absorb the heat and prevent the breaking of the container.

Another object of the invention is to provide a thin blade or knife-like device as specified, one portion of which is provided with a plurality of openings to permit the escape of air bubbles from the interior of the jar or container, when the device is used for removing air bubbles from the fruit or edibles being placed in the jars and further to round the end of the body of the device oppositely from the perforated portion and provide this rounded end with a relatively large opening, by means of which various types of fruit may be engaged and placed, as desired, within the jar or container, through which a knife or other suitable object may be inserted for removing the device from a jar, and which also serve for hanging the device up when not in use.

Other objects of the invention will appear in the following detailed description, taken in connection with the accompanying drawing, forming a part of this specification, and in which drawing:

Figure 1 is a perspective view of the canning device, and

Fig. 2 is a view showing the device inserted in a jar.

Referring more particularly to the drawing, 1 designates the device as an entirety, which is formed of suitable sheet metal, such as steel, aluminum or the like, and if formed of steel or analogous metal, it may be nickel or silver plated if desired. The device, is blade-like, comprising a relatively wide portion 2, the free end of which is rounded as shown at 3. The relatively wide portion 2 of the body of the device is provided with a plurality of perforations 4, which are provided to permit air bubbles to escape therethrough and upwardly out of the jar, when the portion 2 of the device is inserted in the jar and used for removing air bubbles from the fruit or edibles being placed within the jar or container which is indicated by the letter A. The relatively wide portion 2 of the device is connected by means of the neck or reduced portion 5 with the head 6 which head is provided with a relatively large opening 7. The opening 7, is provided, so that the device may be used to move fruit or edibles about in the jar or container A, to properly place the same and the opening permits the head 6 to more firmly engage fruit which has rounded or curved surfaces. This opening may also serve to receive any suitable article such as a knife, fork or the like for removing the device from the jar, when the end 2 is inserted in the jar and it further serves for engagement over a nail or other suitable device to support the canning device when the latter is not in use.

Having thus described the invention, what is claimed is:

1. As a new article of manufacture, a canning device comprising a flat blade-like body of heat conducting material provided with a plurality of perforations in one end portion thereof, a head upon the opposite end of the body and provided with a relatively large perforation extending therethrough.

2. As a new article of manufacture, a canning device comprising a flat blade-like body of heat conducting material, said body comprising a relatively wide portion provided with a plurality of spaced perforations, a head, and a neck connecting the relatively wide portion and said head, said head being provided with an opening extending therethrough.

3. As a new article of manufacture, a canning device comprising a body of conducting material, said body comprising a relatively wide portion provided with a plurality of spaced perforations, a head, and a neck connecting the relatively wide portion and said head, said head being provided with an opening extending therethrough.

NELLIE M. RISING.

Copies of this patent may be obtained for five cents each, by addressing the "Commissioner of Patents, Washington, D. C."